(12) United States Patent
Yamada (10) Patent No.: US 12,313,399 B2
(45) Date of Patent: May 27, 2025

(54) THREE-DIMENSIONAL MEASUREMENT APPARATUS, SYSTEM, AND PRODUCTION METHOD

(71) Applicant: CANON KABUSHIKI KAISHA, Tokyo (JP)

(72) Inventor: Akihiro Yamada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 17/489,553

(22) Filed: Sep. 29, 2021

(65) Prior Publication Data

US 2022/0108464 A1   Apr. 7, 2022

(30) Foreign Application Priority Data

Oct. 5, 2020   (JP) ................. 2020-168486

(51) Int. Cl.
| | | |
|---|---|---|
| *G01B 11/25* | (2006.01) | |
| *G01B 11/24* | (2006.01) | |
| *G01B 21/04* | (2006.01) | |
| *G06T 7/593* | (2017.01) | |
| *G06T 7/70* | (2017.01) | |
| *B25J 19/02* | (2006.01) | |

(52) U.S. Cl.
CPC .......... *G01B 11/2545* (2013.01); *G01B 11/24* (2013.01); *G01B 21/047* (2013.01); *G06T 7/593* (2017.01); *G06T 7/70* (2017.01); *B25J 19/021* (2013.01)

(58) Field of Classification Search
CPC . A23G 1/426; A23G 1/44; A23G 1/48; A23G 1/54; G01B 11/2545; G01B 11/24; G01B 21/047; G06T 7/593; G06T 7/70; G06T 7/521; B07C 5/34; B07C 5/36; B25J 19/021; B65F 1/14; B65F 2210/128; B65F 2210/138; B65F 2210/152; B65F 2210/168; G05B 2219/40584; G06Q 10/30; H04N 13/239
See application file for complete search history.

(56) References Cited

U.S. PATENT DOCUMENTS

| | | | | |
|---|---|---|---|---|
| 9,597,803 | B2* | 3/2017 | Mimura | B25J 9/1697 |
| 2010/0328682 | A1* | 12/2010 | Kotake | G01B 11/25 |
| | | | | 356/620 |
| 2017/0129707 | A1* | 5/2017 | Nakamoto | B65G 47/912 |
| 2018/0361589 | A1* | 12/2018 | Paquin | B25J 9/1697 |
| 2020/0310107 | A1* | 10/2020 | Kojima | G02B 26/085 |

FOREIGN PATENT DOCUMENTS

| | | |
|---|---|---|
| DE | 3612144 A1 | 10/1987 |
| EP | 1711317 B1 | 8/2008 |
| JP | 2017077600 A | 4/2017 |

\* cited by examiner

*Primary Examiner* — Tri T Ton
(74) *Attorney, Agent, or Firm* — Canon U.S.A., Inc. IP Division (57) ABSTRACT

A three-dimensional measurement apparatus includes an attachment portion for attaching the three-dimensional measurement apparatus to a robot, a flange for attaching an end effector, a sensor configured to receive light from an object, and a calculation unit configured to determine three-dimensional information about the object by performing a calculation using data obtained by the sensor. A shortest distance among distances from a center of the flange to an outer peripheral edge of the calculation unit is less than or equal to a radius of the attachment portion or the flange, as viewed from the flange.

17 Claims, 8 Drawing Sheets

THREE-DIMENSIONAL MEASUREMENT APPARATUS, SYSTEM, AND PRODUCTION METHOD

BACKGROUND

Field of the Disclosure

The present disclosure relates to a three-dimensional measurement apparatus, a system, and a production method.

Description of the Related Art

In recent years, robots have been used to perform complicated tasks previously performed by humans, such as picking of industrial product components. A robot hand, which is capable of holding an object and making other motions, is controlled based on a result of measurement of an object performed by a measurement apparatus mounted on a robot. In general, the measurement apparatus is attached to the tip of a driving shaft of the robot so that wide-range viewing angle information can be acquired. For example, US Patent Application Publication No. 2018/0361589 discusses a measurement apparatus that can be attached to an end of a robot arm. In the measurement apparatus discussed in US Patent Application Publication No. 2018/0361589, an image of an object to be measured is captured by a single camera mounted on the measurement apparatus, based on an instruction signal from a robot controller that controls the robot arm. Further, the image is transferred to the robot controller through a cable connected to the measurement apparatus, and the robot controller extracts two-dimensional information about features of the object from the image.

Meanwhile, the number of three-dimensional measurement apparatuses that obtain the position and orientation of an object by obtaining three-dimensional point group information about an object surface has been increasing. As a method of obtaining the three-dimensional point group information, there is adopted, for example, a stereo method in which a distance image is determined based on the principle of triangulation, by detecting corresponding points between images captured from different viewpoints. The distance image indicates three-dimensional information about points on a surface of an object subject to measurement, and is an image in which each pixel has depth information. In Japanese Patent Application Laid-Open No. 2017-77600, a stereo camera is mounted on a robot arm and a distance to an object to be measured is measured. In the measurement apparatus discussed in US Patent Application Publication No. 2018/0361589 and a measurement apparatus discussed in Japanese Patent Application Laid-Open No. 2017-77600, image data is transmitted to a control unit located outside the measurement apparatus via a cable, and the control unit performs a calculation for an image. In order to determine the three-dimensional information, the three-dimensional measurement apparatus is to perform a calculation for a large amount of image data, such as a plurality of images of an object captured by a plurality of cameras, as compared with a two-dimensional measurement apparatus. Thus, in the three-dimensional measurement apparatus, the number of cables for connecting the cameras and the control unit tends to be large in comparison with those in the two-dimensional measurement apparatus, and there is such an issue that the driving range of the robot is restricted depending on the shape of the measurement apparatus and the arrangement of the cables. As a result, the robot cannot be driven in a target path.

SUMMARY

Embodiments of the present disclosure are directed to providing a three-dimensional measurement apparatus that reduces restriction of the drive range of a robot, even if the apparatus is of a type mounted on the robot. According to embodiments of the present disclosure, a three-dimensional measurement apparatus includes an attachment portion for attaching the three-dimensional measurement apparatus to a robot, a flange for attaching an end effector, a sensor configured to receive light from an object, and a calculation unit configured to determine three-dimensional information about the object by performing a calculation using data obtained by the sensor. A shortest distance among distances from a center of the flange to an outer peripheral edge of the calculation unit is less than or equal to a radius of the attachment portion or the flange, as viewed from the flange.

Further features of the present disclosure will become apparent from the following description of exemplary embodiments with reference to the attached drawings.

DESCRIPTION OF THE EMBODIMENTS

Figure 1:
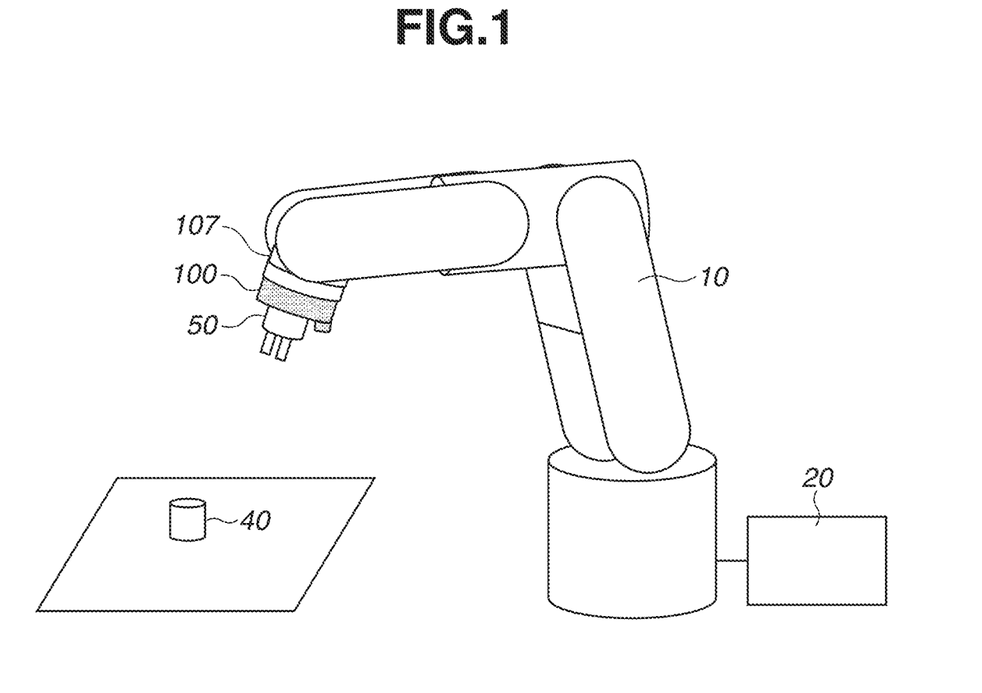
FIG. 1 is a schematic diagram illustrating a system including a robot and a three-dimensional measurement apparatus according to a first exemplary embodiment.

A first exemplary embodiment of the present disclosure will be described below. FIG. 1 is a schematic diagram illustrating a system capable of holding an object using a robot including a three-dimensional measurement apparatus according to a first exemplary embodiment. A three-dimensional measurement apparatus 100 may also be referred to as a 3D vision or a 3D visual apparatus. The three-dimensional measurement apparatus 100 is connected to a flange (a mount portion) disposed at an end of a last joint portion 107 of a robot 10. Further, a robot hand 50 serving as an end effector is attached to the three-dimensional measurement apparatus 100. In this way, the three-dimensional measurement apparatus 100 is disposed between the robot 10 and the robot hand 50.

A robot control unit 20 controls the robot 10 and transmits a trigger signal to start measurement to the three-dimensional measurement apparatus 100 based on the position of the robot 10. Based on the trigger signal, the three-dimensional measurement apparatus 100 measures an object 40 serving as a measurement target placed on an installation surface and determines three-dimensional information. The robot control unit 20 acquires the three-dimensional information about the object 40 determined by the three-dimensional measurement apparatus 100, and controls the robot 10 and the robot hand 50 based on the three-dimensional information so that the robot hand 50 holds the object 40.

Figure 2A:
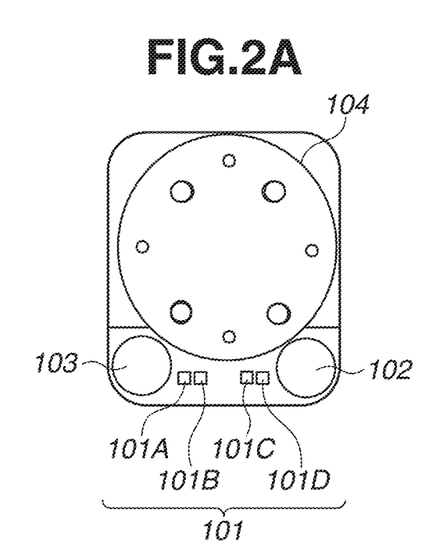
FIGS. 2A, 2B, and 2C are schematic diagrams each illustrating an appearance of the three-dimensional measurement apparatus.
Figure 2B:
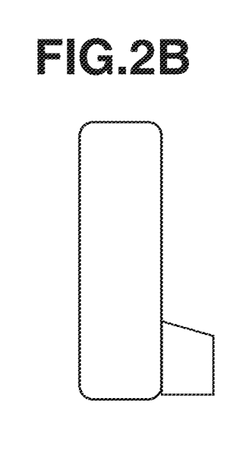
Figure 2C:
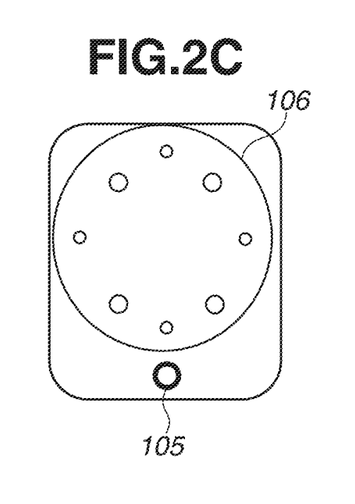

FIGS. 2A, 2B, and 2C are schematic diagrams each illustrating an external appearance of the three-dimensional measurement apparatus 100. FIG. 2A is a front view of the three-dimensional measurement apparatus 100. The three-dimensional measurement apparatus 100 has a vision flange 104 (a flange) for attaching the robot hand 50, and FIG. 2A illustrates a view from the vision flange 104 side (from the front side). The vision flange 104 has screw holes for attachment. FIG. 2B is a side view of the three-dimensional measurement apparatus 100, and illustrates the shape of a housing of the three-dimensional measurement apparatus 100 viewed from a side surface. The three-dimensional measurement apparatus 100 has a fastening portion 106 (an attachment portion) for fastening the three-dimensional measurement apparatus 100 to a robot flange 11, thus attaching the three-dimensional measurement apparatus 100 to the robot 10. FIG. 2C is a view from the fastening portion 106 side (from the back side). The three-dimensional measurement apparatus 100 has a cable connector 105 to which a cable for power supply and transmission and reception of data is to be connected.

Figure 3A:
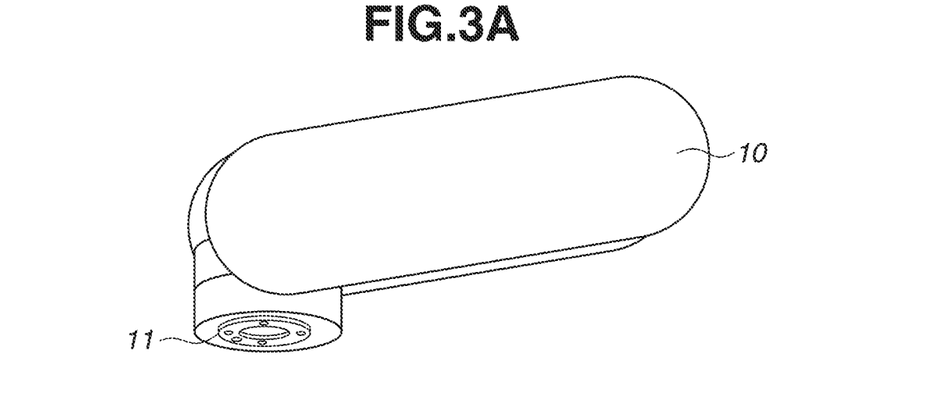
FIGS. 3A, 3B, and 3C are diagrams illustrating an arrangement of the robot, the three-dimensional measurement apparatus, and an end effector.
Figure 3B:
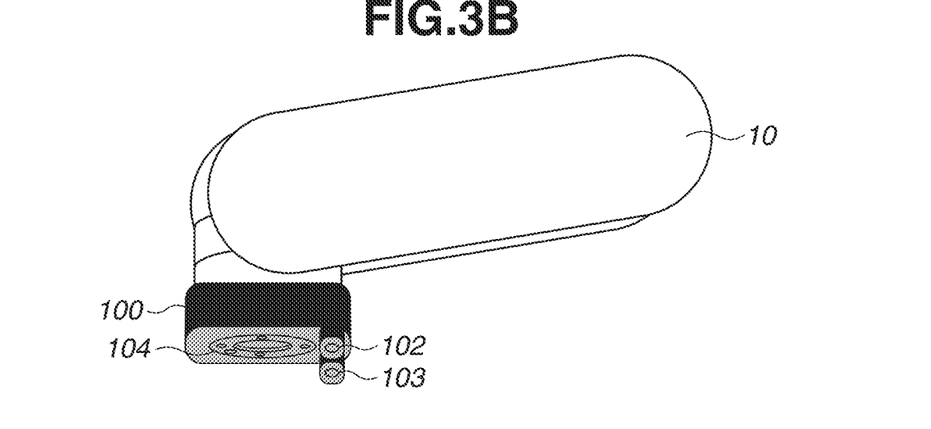
Figure 3C:
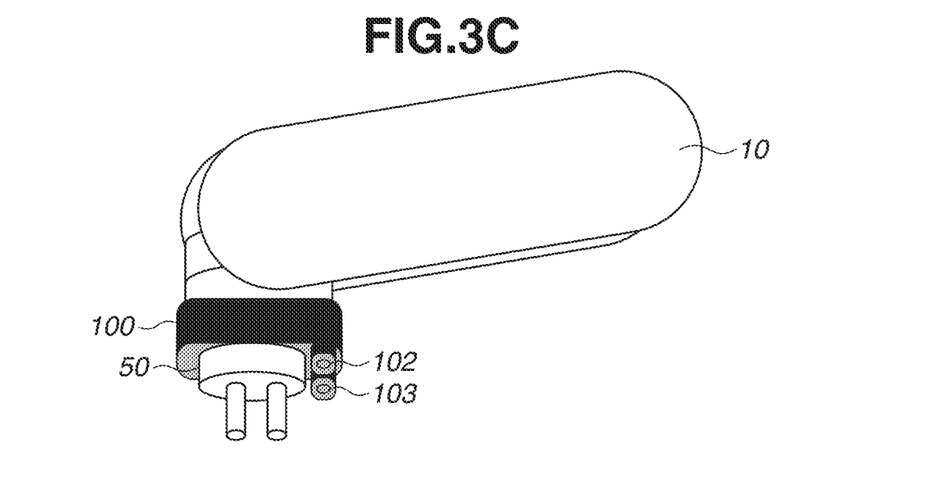

FIGS. 3A, 3B, and 3C illustrate an arrangement relationship between the robot 10, the three-dimensional measurement apparatus 100, and the robot hand 50. FIG. 3A illustrates the robot 10. The robot 10 includes, at the tip thereof, the robot flange 11 (the mount portion) for attaching the robot hand 50 and the three-dimensional measurement apparatus 100. The three-dimensional measurement apparatus 100 can be fastened to the robot 10 by connecting the fastening portion 106 disposed on the back face of the three-dimensional measurement apparatus 100 to the robot flange 11. FIG. 3B illustrates a state where the three-dimensional measurement apparatus 100 is fastened to the robot 10. The three-dimensional measurement apparatus 100 has the vision flange 104 on the front face thereof, and it is possible to fasten the robot hand 50 to the three-dimensional measurement apparatus 100 by connecting the robot hand 50 to the vision flange 104. FIG. 3C illustrates a state where the robot hand 50 is fastened to the three-dimensional measurement apparatus 100.

The three-dimensional measurement apparatus 100 adopts a stereo camera having two image pickup units 102 and 103, as a sensor that receives light from an object. The image pickup units 102 and 103 each include an image pickup lens and an image pickup device such as a complementary metal oxide semiconductor (CMOS) sensor or charge couple device (CCD) sensor.

To perform reliable stereo correspondence and obtain highly accurate three-dimensional information, the three-dimensional measurement apparatus 100 has an illuminator 101 for projecting a dot pattern light beam, and, for example, illuminates the object 40, which is texture-less, with the pattern light beam. The illuminator 101 includes four units 101A to 101D that project pattern light beams different from each other. The illuminator 101 sequentially projects the dot pattern light beams different from each other by temporally changing the unit for projecting the pattern light beam among the four units 101A to 101D from one to another. The image pickup units 102 and 103 sequentially acquire stereo images of the object 40 onto which the dot pattern light beams different from each other are projected.

The three-dimensional measurement apparatus 100 has a calculation unit inside thereof as described below, and the calculation unit acquires a plurality of captured stereo images and determines three-dimensional information by performing calculation processing on the stereo images. The three-dimensional information calculated by the calculation unit refers to, for example, a result of distance point group calculation or a result of object recognition. The calculation unit is, for example, a substrate having a calculation processing device, such as a central processing unit (CPU), a graphics processing unit (GPU), or a field programmable gate array (FPGA). A high-performance calculation processing device is to be used for performing a complicated calculation, such as distance calculation or object recognition at a high speed.

The calculation unit determines the distance image including the three-dimensional point group information by performing the calculation processing on the stereo images, and calculates information about the position and orientation of the object 40, based on the distance image. The calculation unit transmits the determined information about the position and orientation of the object to the robot control unit 20. The robot control unit 20 controls the robot 10 and the robot hand 50 based on the information about the position and orientation of the object 40 acquired from the calculation unit.

Figure 4A:
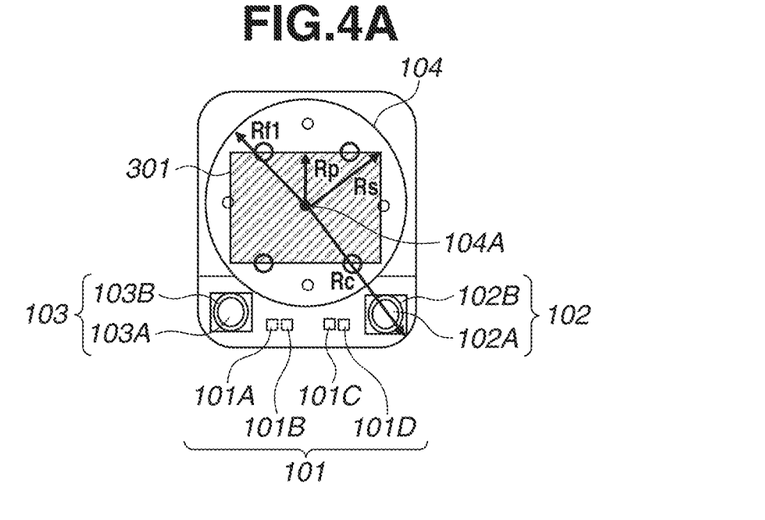
FIGS. 4A, 4B, and 4C are schematic diagrams illustrating the three-dimensional measurement apparatus according to the first exemplary embodiment.
Figure 4B:
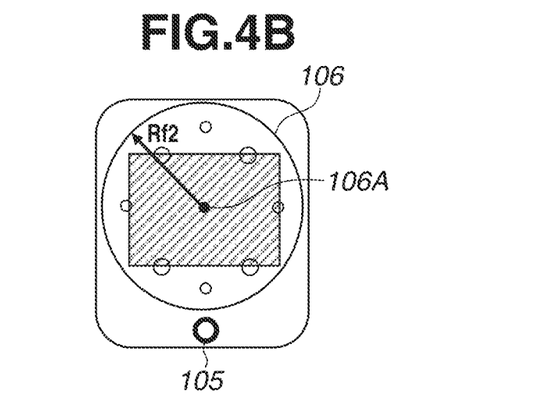
Figure 4C:
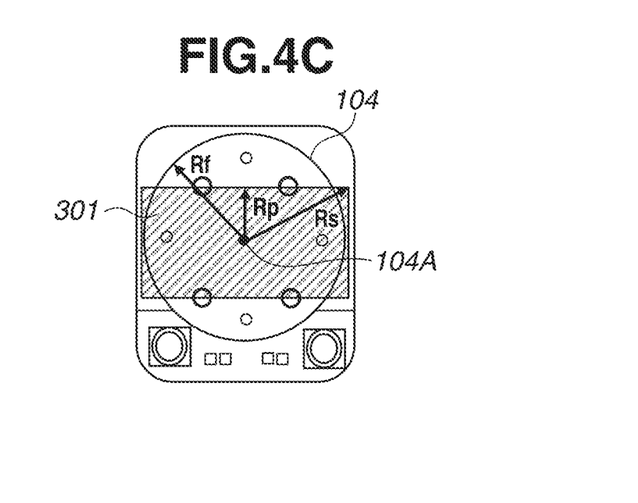

Next, the calculation unit will be described. FIGS. 4A to 4C are diagrams, in each of which a transparent view of the calculation unit 301 is superimposed on an external view of the three-dimensional measurement apparatus 100, to illustrate the disposition of a calculation unit 301 in the three-dimensional measurement apparatus 100. FIG. 4A illustrates the calculation unit 301 inside the housing of the three-dimensional measurement apparatus 100, in a view when the three-dimensional measurement apparatus 100 is viewed from the front face. FIG. 4B illustrates the calculation unit 301 inside the housing of the three-dimensional measurement apparatus 100, in a view when the three-dimensional measurement apparatus 100 is viewed from the back face.

In FIG. 4A, the calculation unit 301 has a single substrate having a rectangular external shape, and a calculation processing device, a memory, and a circuit necessary for calculation, such as a peripheral electric circuit, are formed on the substrate.

The image pickup unit 102 has an image pickup optical system 102A including a lens and a lens barrel, and an image pickup substrate 102B on which an image pickup device is mounted. Similarly, the image pickup unit 103 has an image pickup optical system 103A including a lens and a lens barrel, and an image pickup substrate 103B on which an image pickup device is mounted.

The calculation unit 301 is connected to a drive substrate of the illuminator 101 and to the image pickup units 102 and 103 with internal wiring, in the inside of the three-dimensional measurement apparatus 100. Transmission of an illumination instruction to the illuminator 101 from the calculation unit 301, transmission of an image pickup instruction to each of the image pickup units 102 and 103, and image transfer from the image pickup units 102 and 103 is performed via this internal wiring.

The vision flange 104 on the surface of the three-dimensional measurement apparatus 100 is a flange having a circular outer peripheral shape. The robot hand 50 is attached to the three-dimensional measurement apparatus 100 by being fastened to the vision flange 104 with a bolt or the like. The fastening portion 106 on the back face of the three-dimensional measurement apparatus 100 is also a circular flange that conforms to the external shape of the robot flange 11. The three-dimensional measurement apparatus 100 is attached to the robot 10 by fastening the fastening portion 106 with a bolt or the like to conform to the external shape of the robot flange 11.

Thus, if the robot 10 and the robot hand 50 physically interfere with or are brought into contact with the three-dimensional measurement apparatus 100 when the robot hand 50 is driven, the driving range of the robot 10 is restricted. For this reason, desirably, the three-dimensional measurement apparatus 100 is configured so as not to greatly protrude from the flange between the robot 10 or the robot hand 50 and the three-dimensional measurement apparatus 100, in order to avoid restricting the driving range of the robot 10 as much as possible.

Thus, in the present exemplary embodiment, the shortest distance among distances from a center 104A of the circle of the vision flange 104 to the outer peripheral edge of the calculation unit 301 is less than or equal to the radius of the vision flange 104, as viewed from the vision flange 104 side of the three-dimensional measurement apparatus 100. In other words, the disposition and the shape of the calculation unit 301 are set to satisfy $Rp \leq Rf1$. Here, the shortest distance among the distances from the center 104A of the circle of the vision flange 104 to the outer peripheral edge of the calculation unit 301 is Rp, and the radius of the vision flange 104 is Rf1.

Alternatively, $Rp<Rf1$ may be adopted. It is desirable that, as illustrated in FIG. 4A, the entire calculation unit 301 be disposed inside the external circle of the vision flange 104 as viewed from the vision flange 104 side. In other words, when the longest distance from the center 104A of the circle of the vision flange 104 to the outer peripheral edge of the calculation unit 301 is Rs, the calculation unit 301 is disposed and has a shape so that Rs is less than Rf1. In other words, $Rs<Rf1$ is satisfied.

A similar configuration is applied to that in a case where the three-dimensional measurement apparatus 100 is viewed from the fastening portion 106 side. In other words, when the radius of the fastening portion 106 is Rf2, and a center 106A of the circle of the fastening portion 106 is on the central axis of the circle of the vision flange 104, the disposition and the shape of the calculation unit 301 are set to satisfy $Rp<Rf2$. Desirably, $Rp<Rf2$ and $Rs<Rf1$ are satisfied. It is only required that at least one of Rf1 and Rf2 satisfies the above-described relationship with Rp.

Other examples of the disposition and the shape of the calculation unit 301 include a case where Rs is greater than Rf1 although $Rp<Rf1$ is satisfied, as illustrated in FIG. 4C.

Typically, the robot flange 11 is circular, but in a case where the robot flange 11 is not circular, the fastening portion 106 is not circular either to conform thereto. In such a case, Rf2 is the radius of a circumscribed circle touching the outer periphery of the fastening portion 106. A similar configuration applies to Rf1.

As described above, in the present exemplary embodiment, the calculation unit 301 is disposed in a space between the robot flange 11 and the vision flange 104. This makes it possible to build the calculation unit 301 in the three-dimensional measurement apparatus 100 without increasing the amount of a protrusion of the housing of the three-dimensional measurement apparatus 100 from the flange.

Meanwhile, the image pickup units 102 and 103 are disposed outside the vision flange 104 to secure a field of view irrespective of the end effector connected to the tip of the vision flange 104. In other words, the distance from the center 104A of the vision flange 104 to each of the image pickup units 102 to 103 is more than or equal to the radius of the vision flange 104. When the distance from the center 104A of the vision flange 104 to the farthest end of either the substrate mounted with the image pickup device or the image pickup lens of each of the image pickup units 102 and 103 is Rc, $Rf1<Rc$ is established to the extent that the field of view of the image pickup lens is not blocked. In FIG. 4A, Rc is the distance from the center 104A of the vision flange 104 to the outer end of the image pickup substrate 102B or 103B. In a case where the external diameter of the image pickup lens is greater than the substrate size, Rc is the distance from the center 104A of the vision flange 104 to the end of the image pickup lens.

Figure 5:
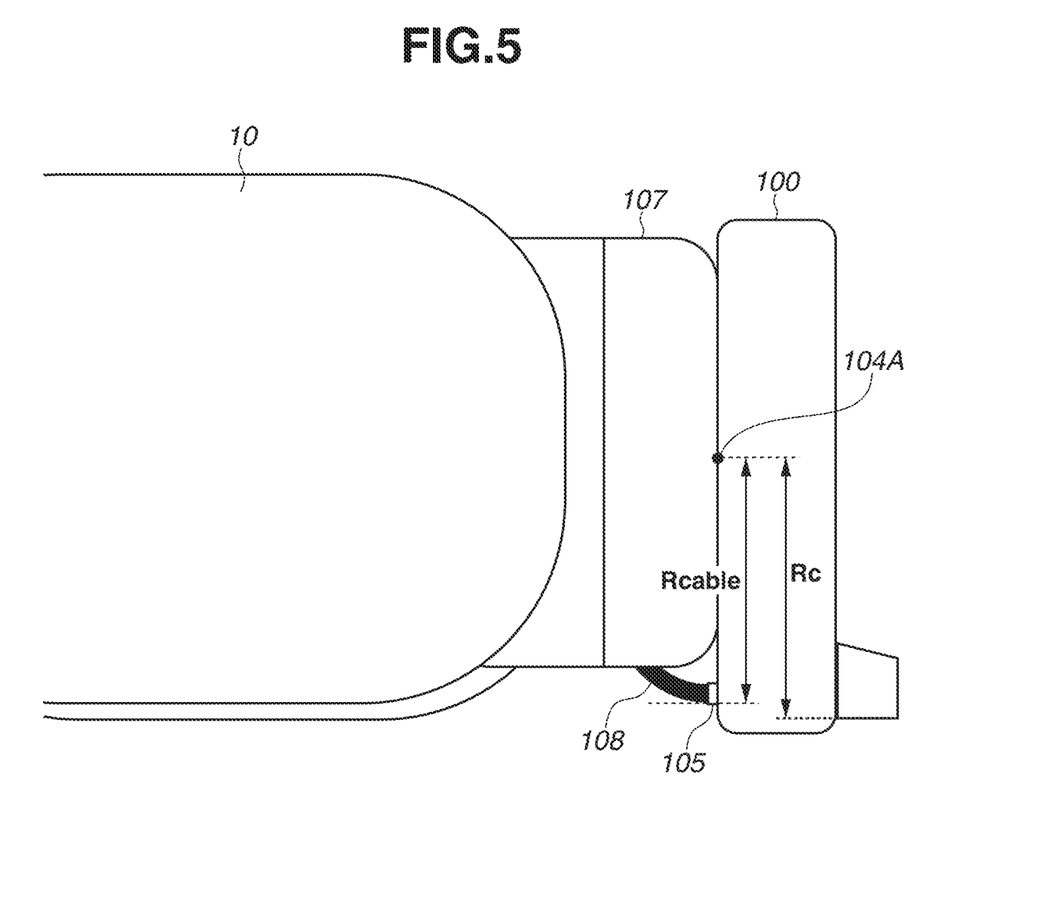
FIG. 5 is a side view of the three-dimensional measurement apparatus attached to the robot.

FIG. 5 illustrates a side view of the three-dimensional measurement apparatus 100 fastened to the robot 10. The three-dimensional measurement apparatus 100 is fastened to an end surface of the last joint portion 107 of the robot 10 via the robot flange 11. A cable 108 for transmitting power, visual information, calculation information, and image pickup timing information for the three-dimensional measurement apparatus 100 is connected to the cable connector 105 of the three-dimensional measurement apparatus 100. In the present exemplary embodiment, $Rcable<Rc$ is established, where Rcable is the distance from the center of the fastening portion 106 of the three-dimensional measurement apparatus 100 to the farthest end of the cable connector 105. In the present exemplary embodiment, on the assumption that the internal wiring of the robot 10 is used, the other end of the cable 108, which is not the end on the three-dimensional measurement apparatus 100 side, is connected to a robot internal wiring connector disposed on a side surface of the last joint portion 107 of the robot 10. Disposing the cable 108 in this way can simplify cable routing, so that influence on the driving range of the robot 10 can be reduced.

The three-dimensional measurement apparatus 100 includes the calculation unit 301 disposed therein, obtains images from the image pickup units 102 and 103, and calculates the three-dimensional information, thus compressing an information amount (data amount) with respect to the information about the obtained picked-up images. An amount of information to be transmitted to the outside of the three-dimensional measurement apparatus 100 can be thereby made relatively small. For example, the information to be transferred can be reduced to about a half, only by performing a distance image calculation on a single stereo image to render it as three-dimensional point group coordinates. In particular, as in the present exemplary embodiment, in a case where a plurality of stereo images that is acquired while illumination units each for projecting emitting dot pattern light are temporally changed is used, the effect is even greater. For example, in a case where four stereo images acquired while the illumination units are temporally changed from one to another four times are used, the information to be transferred can be reduced to about 1/8 or less. Further, in a case where a target object is identified and only information about the position and orientation of the object is to be transferred as its three-dimensional information, only information of degree of freedom for the number of target objects×6 is to be transferred, so that the information to be transferred can be dramatically reduced.

The three-dimensional information determined by the calculation unit 301 is transferred from the calculation unit 301 to the robot control unit 20 via the cable 108 connected to the cable connector 105 and the internal wiring of the robot 10.

In the present exemplary embodiment, the effect of the reduction in transfer information by the calculation unit 301 enables sufficiently high-speed transfer even if an ordinary transfer means is used, so that robot control can be performed rapidly and stably. For the transfer means, Ethernet may be used, or Wireless Fidelity (WiFi), which is a wireless network protocol, may be used. Incorporation of Ethernet into robot inner wiring has progressed, and using the robot inner wiring can reduce or prevent restriction of the robot driving range due to a transfer cable. If WiFi (a communication unit) is used, no transfer cable is necessary, and therefore, WiFi is more desirable in terms of restriction of the robot driving range.

In the present exemplary embodiment, the calculation unit 301 performs calculations that place a processing load on the calculation unit 301, such as a distance calculation or position/orientation calculation, and thus heat generated from the calculation unit 301 is prone to increase. To address the heat generation from the calculation unit 301, the outer peripheral portion of the three-dimensional measurement apparatus 100 is used as a heat radiation portion. Specifically, a heat conductive sheet (a heat conductive member) is affixed to the calculation unit 301, and heat is released by connecting this sheet to the side-surface outer periphery of the housing of the three-dimensional measurement apparatus 100. The heat conductive sheet is, for example, a graphite sheet, and heat radiation to the housing side-surface of the three-dimensional measurement apparatus 100 is realized. Further, a part of the housing side-surface of the three-dimensional measurement apparatus 100 is used as a heatsink with a structure having a large surface area, so that the heat can be more efficiently dissipated.

In this way, a calculation element which is a heat source of the calculation unit 301 and the periphery of the measurement apparatus main body are thermally connected using the heat conductive member, so that effective heat dissipation is realized, and a high-performance calculation unit with a large heating value can be mounted. In a case where there is a concern for an inflow of heat from the robot or end effector to the flange of the robot or end effector, it is possible to provide an insulation member for increasing insulation between the calculation unit 301 or the side-surface outer periphery of the housing of the three-dimensional measurement apparatus 100 and this flange. For example, the insulation member is disposed in at least one of an area between the robot flange 11 (the mount portion) and the calculation unit 301, and an area between the vision flange 104 and the calculation unit 301.

In the present exemplary embodiment, the calculation unit 301 includes a single substrate, but may include a plurality of divided substrates. The illuminator 101 and the image pickup units 102 and 103 are formed on the substrates different from the substrate of the calculation unit 301, but these all may be formed on the same substrate. A case where these are formed on the same substrate will be described in a second exemplary embodiment.

Figure 6:
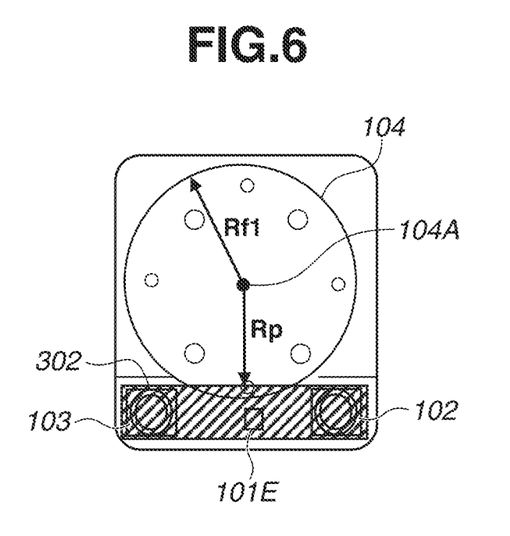
FIG. 6 is a schematic diagram illustrating a three-dimensional measurement apparatus according to a second exemplary embodiment.

The second exemplary embodiment of the present disclosure will be described below. In the present exemplary embodiment, a part different from the first exemplary embodiment will be described. In the present exemplary embodiment, a calculation unit is different from that of the first exemplary embodiment. FIG. 6 is a diagram illustrating a calculation unit 302 disposed inside a housing of a three-dimensional measurement apparatus 100 and seen therethrough, in a view when the three-dimensional measurement apparatus 100 is viewed from the front face. In FIG. 6, the calculation unit 302 has a substrate having a rectangular external shape, and an illuminator 101 (unit 101E, described below) and image pickup units 102 and 103 are formed on this substrate, together with a circuit for calculation. The calculation element of the calculation unit 302, the illuminator 101, and the image pickup units 102 and 103 are connected by wiring on the substrate.

The illuminator 101 has one unit 101E that projects a dot pattern light beam, and one stereo image of an object onto which the dot pattern light beam is projected is obtained using the image pickup units 102 and 103. The calculation unit 302 performs a distance image calculation from the stereo image, and determines three-dimensional point group coordinates. While the calculation unit 301 of the first exemplary embodiment calculates the information about the three-dimensional position and orientation, the calculation unit 302 of the present exemplary embodiment performs distance image calculation from a stereo image and determines the three-dimensional point group coordinates. The calculation capacity of the calculation unit 302 of the present exemplary embodiment may be lower than that of the calculation unit 301 of the first exemplary embodiment, and thus the size of the calculation unit 302 can be reduced. Thus, the calculation unit 302 can be disposed in a small space on the substrate on which the illuminator 101 and the image pickup units 102 and 103 are disposed. A basic part, which is formed by the illuminator 101, the image pickup units 102 and 103, and the calculation unit 302, of the three-dimensional measurement apparatus 100 is thereby minimized.

In the present exemplary embodiment, as viewed from a vision flange 104 side of the three-dimensional measurement apparatus 100, the disposition and the shape of the calculation unit 302 are set to satisfy Rp<Rf1. Here, Rp is the shortest distance among distances from a center 104A of the circle of the vision flange 104 to the outer peripheral edge of the calculation unit 302, and the shortest distance corresponds to the outer peripheral edge on the vision flange 104 side of the calculation unit 302.

Figure 7A:
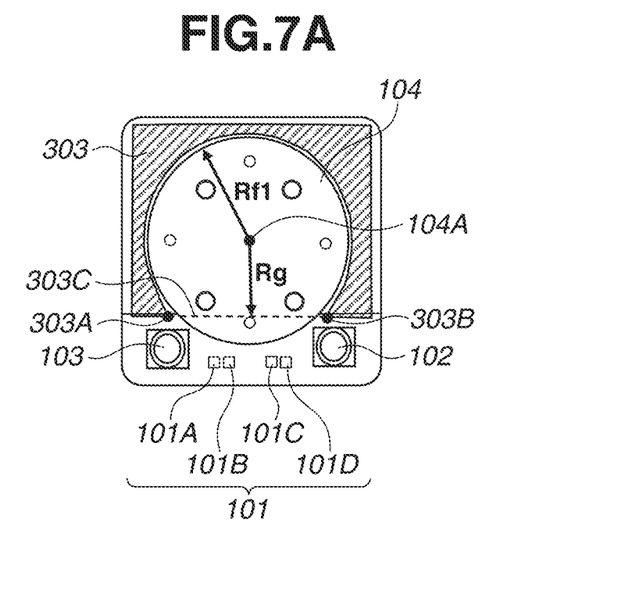
FIGS. 7A and 7B are schematic diagrams illustrating a three-dimensional measurement apparatus according to a third exemplary embodiment.

A third exemplary embodiment of the present disclosure will be described below. In the present exemplary embodiment, a part different from the above-described exemplary embodiments will be described. In the present exemplary embodiment, a calculation unit is different from those of the above-described exemplary embodiments. FIG. 7A illustrates a calculation unit 303 disposed inside a housing of a three-dimensional measurement apparatus 100 and seen therethrough, in a view when the three-dimensional measurement apparatus 100 is viewed from the front face.

The calculation unit 303 is disposed outside a radius Rf1 of a vision flange 104 to avoid overlapping the vision flange 104. The calculation unit 303 is disposed also to avoid overlapping image pickup units 102 and 103 and an illuminator 101. In such disposition, the calculation unit 303 is not disposed in an inner space between a robot flange and the vision flange 104, and thus, there is such an advantageous effect of minimizing the distance between these flanges. As a result, the distance from a last joint portion 107 of a robot to the tip of an end effector can be reduced, and thus a working range of the robot can be maximized.

Here, a distance Rg between a straight line 303C linking both ends 303A and 303B of the inner peripheral edge of the calculation unit 303 and a center 104A of the vision flange 104 is less than a radius Rf1 of the vision flange 104. In other words, Rg<Rf1 is established.

Figure 7B:
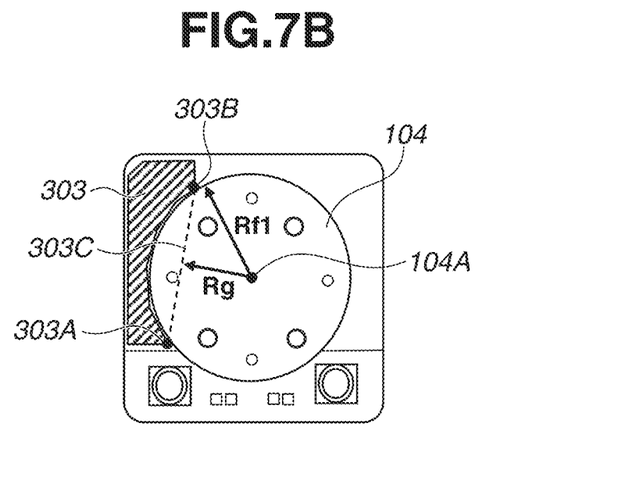

In another example of the disposition and the shape of the calculation unit 303, the calculation unit 303 is disposed on the outside and the left half side of the vision flange 104, as illustrated in FIG. 7B. In this example as well, the distance Rg between the straight line 303C linking the ends 303A and 303B of the inner peripheral edge of the calculation unit 303 and the center 104A is less than the radius Rf1 of the vision flange 104.

Figure 8:
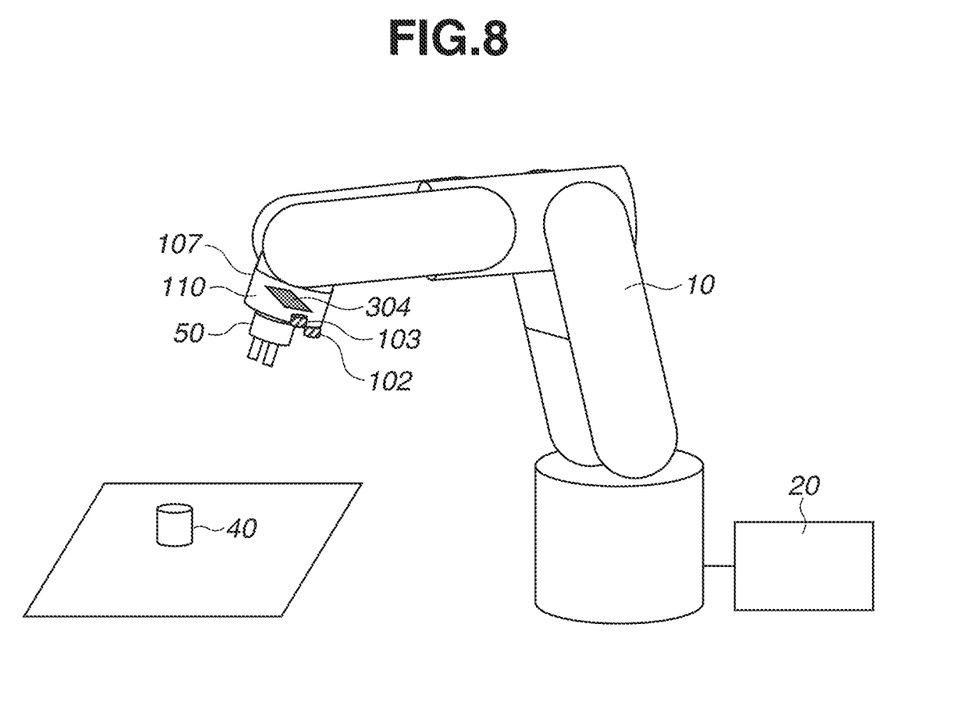
FIG. 8 is a schematic diagram illustrating a system including a robot and a three-dimensional measurement apparatus according to a fourth exemplary embodiment.

A fourth exemplary embodiment of the present disclosure will be described below. In the above-described exemplary embodiments, the three-dimensional measurement apparatus 100 is mounted on the flange for attaching the end effector of the robot 10. In the present exemplary embodiment, a three-dimensional measurement apparatus 110 is incorporated into a last joint portion 107 of a robot 10. A calculation unit 304 of the three-dimensional measurement apparatus 110 is also disposed inside the last joint portion 107 as illustrated in FIG. 8. A flange for mounting a robot hand 50 is formed on a surface of the three-dimensional measurement apparatus 110, and the robot hand 50 is fastened to this flange.

Image pickup units 102 and 103 and an illuminator 101 are mounted on an end surface of the last joint portion 107. In this disposition, a movable joint is not interposed between the calculation unit 304 and the image pickup unit 102 or 103 or the illuminator 101, and therefore, a transfer failure and physical destruction of inner wiring, which are undesirable, can be avoided, as compared with a case where a movable joint is present. According to the above-described exemplary embodiments, it is possible to provide a three-dimensional measurement apparatus that reduces restriction of the drive range of a robot, even if this apparatus is of a type mounted on the robot.

<Method of Producing Article>

Next, using any of the above-described three-dimensional measurement apparatuses, a method of producing an article, such as a machine component, will be described. First, in a state where a plurality of objects including a machine component is randomly piled, the objects are measured using the above-described three-dimensional measurement apparatus, so that the position and orientation of each of the objects are measured. Based on the measured position and orientation, the robot control unit controls the robot to cause the robot to hold and move the object using a holding member, such as a hand of the robot. The moved object undergoes a process of being connected to another component, being fastened, and/or being inserted into another component. Other processes can be performed in other process steps. An article including the object having undergone such processes is then produced.

The exemplary embodiments of the present disclosure have been described above, but the present disclosure is not limited to these exemplary embodiments, and various modifications and changes can be made within the scope of the claims.

While the present disclosure includes exemplary embodiments, it is to be understood that the disclosure is not limited to the disclosed exemplary embodiments. The scope of the following claims is to be accorded the broadest interpretation.

This application claims the benefit of Japanese Patent Application No. 2020-168486, filed Oct. 5, 2020, which is hereby incorporated by reference herein in its entirety.

What is claimed is:

1. A three-dimensional measurement apparatus comprising:
   an attachment portion for attaching the three-dimensional measurement apparatus to a robot;
   a flange for attaching an end effector;
   a sensor configured to receive light from an object;
   at least one processor arranged on a substrate,
   wherein the at least one processor and the substrate are the elements of a calculation unit, the calculation unit is arranged between the attachment portion and the flange; and
   wherein the at least one processor is configured to, by performing calculation processing on a plurality of images acquired by the sensor, determine three-dimensional point group information on a surface of the object, and calculate information about position and orientation of the object, based on the three-dimensional point group information,
   wherein a shortest distance among distances from a center of the flange to an outer peripheral edge of the substrate is less than or equal to a radius of the attachment portion or the flange, as viewed from the flange side, and
   wherein the information about the position and orientation of the object is transferred to a robot control unit.

2. The three-dimensional measurement apparatus according to claim 1, wherein a longest distance among the distances from the center of the flange to the outer peripheral edge of the substrate is less than or equal to the radius of the attachment portion or the flange, as viewed from the flange side.

3. The three-dimensional measurement apparatus according to claim 1, wherein the at least one processor further functions as an image pickup device configured to pick up an image of an object.

4. The three-dimensional measurement apparatus according to claim 3, wherein the sensor includes a plurality of the image pickup devices.

5. The three-dimensional measurement apparatus according to claim 1,
   wherein a data amount of the position and the orientation of the object is smaller than a data amount of the distance.

6. The three-dimensional measurement apparatus according to claim 1, further comprising a cable connector for transmitting data determined by the calculation processing device,
   wherein a position of the cable connector is outside of the attachment portion and the flange, as viewed from the flange side.

7. The three-dimensional measurement apparatus according to claim 6, wherein power is supplied to the three-dimensional measurement apparatus via the cable connector.

8. The three-dimensional measurement apparatus according to claim 6, wherein a distance from the center of the flange to a farthest end of the cable connector is less than a distance from the center of the flange to a farthest end of the sensor, as viewed from the flange side.

9. The three-dimensional measurement apparatus according to claim 6, wherein the cable connector is on a side on which the attachment portion is located, in the three-dimensional measurement apparatus.

10. The three-dimensional measurement apparatus according to claim 1, wherein the at least one processor further functions as:

a communication unit configured to wirelessly transmit data determined by the calculation processing device.

11. The three-dimensional measurement apparatus according to claim 1, further comprising a heat conductive member that connects the substrate and a housing of the three-dimensional measurement apparatus.

12. The three-dimensional measurement apparatus according to claim 11, wherein a heatsink is disposed on a side-surface of the housing of the three-dimensional measurement apparatus, and the heat conductive member and the heatsink are thermally connected.

13. The three-dimensional measurement apparatus according to claim 11, wherein an insulation member is disposed in at least one of an area between the attachment portion and the substrate and an area between the flange and the substrate.

14. A system comprising:
the three-dimensional measurement apparatus according to claim 1; and
a robot to which the three-dimensional measurement apparatus is attached.

15. A production method for an article, the method comprising:
measuring an object using the three-dimensional measurement apparatus according to claim 1; and
producing the article by processing the object based on three-dimensional information about the measured object.

16. The three-dimensional measurement apparatus according to claim 1, wherein the positional relationship of the calculation unit, the attachment portion, and the flange are relatively fixed.

17. The three-dimensional measurement apparatus according to claim 1, wherein each position of the substrate, the at least one processor, and the memory is respectively fixed with respect to the flange.

* * * * *